United States Patent
Tankala et al.

(10) Patent No.: US 8,655,129 B2
(45) Date of Patent: Feb. 18, 2014

(54) OPTICAL FIBER WITH SUPPRESSED STIMULATED BRILLOUIN SCATTERING

(75) Inventors: Kanishka Tankala, South Windsor, CT (US); Kevin Farley, South Windsor, CT (US)

(73) Assignee: Nufern, East Granby, CT (US)

( * ) Notice: Subject to any disclaimer, the term of this patent is extended or adjusted under 35 U.S.C. 154(b) by 201 days.

(21) Appl. No.: 13/145,653

(22) PCT Filed: Jan. 22, 2010

(86) PCT No.: PCT/US2010/021738
§ 371 (c)(1),
(2), (4) Date: Jul. 21, 2011

(87) PCT Pub. No.: WO2010/085605
PCT Pub. Date: Jul. 29, 2010

(65) Prior Publication Data
US 2011/0280584 A1    Nov. 17, 2011

Related U.S. Application Data

(60) Provisional application No. 61/147,038, filed on Jan. 23, 2009.

(51) Int. Cl.
G02B 6/02    (2006.01)
(52) U.S. Cl.
USPC ............................................ 385/123
(58) Field of Classification Search
None
See application file for complete search history.

(56) References Cited

U.S. PATENT DOCUMENTS

| | | |
|---|---|---|
| 5,848,215 A | 12/1998 | Akasaka et al. |
| 7,082,243 B2 | 7/2006 | Bickham et al. |
| 7,130,514 B1 | 10/2006 | Chen et al. |
| 7,167,621 B2 | 1/2007 | Manyam et al. |
| 2005/0226580 A1 | 10/2005 | Samson et al. |
| 2006/0198590 A1 | 9/2006 | Farroni et al. |
| 2007/0116416 A1 | 5/2007 | Chen et al. |
| 2008/0080823 A1 | 4/2008 | Gray et al. |
| 2008/0152288 A1 | 6/2008 | Flammer et al. |

FOREIGN PATENT DOCUMENTS

WO    02/14920 A1    2/2002

OTHER PUBLICATIONS

Jen, C.K. et al, "Role of guided acoustic wave properties in single-mode optical fibre design," 1988, Electronics Letters, vol. 24, No. 23, pp. 1419-1420.
Li et al, "Al/Ge co-doped large mode area fiber with high SBS threshold," 2007, Optics Express 15(13), 8290-8299.
Ruffin, A. Boh, "Stimulated Brillouin Scattering: An Overview of Measurements, System Impairments, and Applications,"NIST-SOFM 2004, pp. 1-6.

*Primary Examiner* — Jerry Rahll
(74) *Attorney, Agent, or Firm* — McDonnell Boehnen Hulbert & Berghoff LLP

(57) ABSTRACT

The present invention relates to optical fibers useful for the transmission of electromagnetic energy at such high levels of power that stimulated Brillouin scattering (SBS) may be of importance. One aspect of the present invention is an optical fiber for the propagation of optical radiation having an optical wavelength, the optical fiber and optical wavelength having an SBS acoustic wavelength associated therewith, the optical fiber comprising a core having a geometrical center and an outer perimeter; and a cladding surrounding the core; wherein the core is rare earth doped and substantially free of germanium, the optical fiber has a refractive index profile such that the core is guiding for optical radiation having the optical wavelength, and the optical fiber has an acoustic index profile such that the core is antiguiding for an acoustic wave having the SBS acoustic wavelength.

20 Claims, 11 Drawing Sheets

OPTICAL FIBER WITH SUPPRESSED STIMULATED BRILLOUIN SCATTERING

CROSS-REFERENCE TO RELATED APPLICATIONS

This application claims the priority of U.S. Provisional Patent Application Ser. No. 61/147,038, entitled "Optical Fiber With Suppressed Stimulated Brillouin Scattering" and filed on Jan. 23, 2009, which is hereby incorporated herein by reference in its entirety.

BACKGROUND OF THE INVENTION

1. Field of the Invention

The present invention relates generally to optical waveguides for the transmission of electromagnetic energy. The present invention relates more particularly to optical fibers useful for the transmission of electromagnetic energy at such high levels of power that stimulated Brillouin scattering (SBS) may be of importance.

2. Technical Background

SBS can impose a practical upper limit on the amount of useful power that can be transmitted by an optical waveguide, such as an optical fiber. Without wishing to be bound by any particular theory, SBS is generally understood to be a non-linear acousto-optic effect in which responsive to electromagnetic energy propagating in the forward direction, electromagnetic energy is scattered in the backward direction accompanied by the release of phonon energy. The backward propagating electromagnetic energy is down-shifted in frequency from the forward propagating electromagnetic energy.

SBS can lead to a drop in transmission efficiency above a threshold input power, as is well understood in the art. Once the threshold input power has been reached, launching additional power in the forward direction results in little or no increase in power being transmitted the forward direction; most or all of the additional input power is scattered in the backward direction. The SBS threshold power can depend on the fiber length and the power density. The build-up of SBS is greater at longer lengths. Similarly, a smaller core size increases the power density and hence quickens the onset of SBS. SBS can limit one or both of the amount of power that can be transmitted as well as the distance over which a given amount of power can be transmitted. SBS is particularly severe for the transmission of electromagnetic energy having a narrow line width, such as is often provided by laser sources. For example, certain major industrial laser systems currently transmit 4-5 kW of Nd-YAG power over about a 50 meter length of fiber. It can be difficult to transmit such power levels over lengths more than 50 meters. One of the factors limiting the length is SBS.

The limitations that SBS can impose on the transmission of electromagnetic energy over optical fibers are well known, and various forms and constructions of optical fiber have been proposed in the past with the aim of reducing or suppressing the SBS phenomenon. While some of these optical fibers might have represented an improvement in the art, each can have drawbacks or limitations in certain circumstances. Accordingly, there remains a need for optical fibers that address one or more of the drawbacks or deficiencies of the prior art.

SUMMARY OF THE INVENTION

One aspect of the present invention is an optical fiber for the propagation of optical radiation having an optical wavelength, the optical fiber and optical wavelength having an SBS acoustic wavelength associated therewith, the optical fiber comprising a core having a geometrical center and an outer perimeter; and a cladding surrounding the core; wherein the core is rare earth doped and substantially free of germanium, the optical fiber has a refractive index profile such that the core is guiding for optical radiation having the optical wavelength, and the optical fiber has an acoustic index profile such that the core is antiguiding for an acoustic wave having the SBS acoustic wavelength.

Another aspect of the invention is an optical fiber for the propagation of optical radiation having an optical wavelength, the optical fiber comprising a core having a geometrical center and an outer perimeter; and a cladding surrounding the core; wherein the core is doped with aluminum and a refractive index-reducing dopant; and the optical fiber has a refractive index profile such that the core is guiding for optical radiation having the optical wavelength.

Another aspect of the invention is an optical fiber for the propagation of optical radiation having an optical wavelength, the optical fiber comprising a core having a geometrical center and an outer perimeter; and a cladding surrounding the core; wherein the core is doped with aluminum and phosphorus; and the optical fiber has a refractive index profile such that the core is guiding for optical radiation having the optical wavelength.

In an additional aspect, the invention can provide an optical fiber for the propagation of optical radiation having an optical wavelength, the optical fiber and optical wavelength having an SBS acoustic wavelength associated therewith, the optical fiber comprising a core having a geometrical center, an outer perimeter and an average radius that yields the cross section area of the core as defined by the outer perimeter; a cladding surrounding the core; the core being rare earth doped and substantially free of germanium; the optical fiber having a refractive index profile such that the core is guiding for optical radiation having the optical wavelength; and the optical fiber having an acoustic index profile such that the core is antiguiding for an acoustic wave having the SBS acoustic wavelength.

The region of the fiber outside of the core and within 5 μm of the outer perimeter thereof can have an average acoustic index at least about 0.005 greater than the average acoustic index of the region of the core lying no more than 20% of the average core radius from the geometrical center of the core. The optical fiber can have a numerical aperture in the range of about 0.01 to about 0.6. The optical fiber can further comprise a second cladding surrounding the cladding and having an inner perimeter, wherein the cladding and the region of the second cladding within 10 μm of its inner perimeter differ in refractive index profile, acoustic index profile, or both. The region of the optical fiber outside of the core and within 5 μm of the outer perimeter thereof has an average acoustic index greater than the average acoustic index of the region of the second cladding lying within 10 μm of its inner perimeter. The region of the fiber outside of the core and within 5 μm of the outer perimeter thereof has an average refractive index greater than the average refractive index of the region of the second cladding lying within 10 μm of its inner perimeter.

The cladding can have a thickness in the range of about 5 μm to about 60 μm. In certain practices of the invention, the core has an average germanium concentration of no more than about 0.01 wt % measured as $GeO_2$. The optical fiber can comprise a normalized overlap integral between the electric field of the fundamental guided optical mode for the optical wavelength and the lowest order longitudinal acoustic field for the SBS acoustic wavelength, and wherein the value of the overlap integral is no greater than about 0.5. In certain practices of the invention, the value of the overlap integral is no less than about 0.05.

In a further aspect, the invention can provide an optical fiber for the propagation of optical radiation having an optical wavelength, where the optical fiber and optical wavelength have an SBS acoustic wavelength associated therewith. The optical fiber can comprise a core having an outer perimeter and a geometrical center; a cladding surrounding the core; a refractive index profile such that the core is guiding for optical radiation having the optical wavelength; and an acoustic index profile such that the core is antiguiding for an acoustic wave having the SBS acoustic wavelength. The core can consist essentially of a first region that includes the geometrical center, and a second region immediately surrounding the first region and extending to the outer perimeter of the core, wherein the core has a $\Delta n_{max}$ that is the difference between the maximum refractive index of the core and the average refractive index of the region of the cladding within 5 μm of the outer perimeter of the core. The difference between the average refractive indices of the first region of the core and the second region of the core can be no more than about $0.5\Delta n_{max}$; the core can have a $\Delta AI_{max}$ that is the difference between the average acoustic index of the region of the fiber outside of the core and within 5 μm of the outer perimeter thereof and the minimum acoustic index of the core; and the difference between the average acoustic indices of the first region of the core and the second region of the core is no less than about $0.5\Delta AI_{max}$.

The second region of the core can be doped with phosphorus. The second region of the core can be co-doped with fluorine and/or boron. The optical fiber can be a step-index fiber. The refractive and acoustic index profiles of the core can be graded. The refractive index profile can be graded from a maximum value at or near the geometrical center of the core to a substantially lower value at the outer perimeter of the core, and the acoustic index profile can be graded from a minimum value at or near the geometrical center of the core to a substantially higher value at the outer perimeter of the core.

The core can have a $\Delta n_{max}$ that is the difference between the maximum refractive index of the core and the average refractive index of the region of the fiber outside of the core and within 5 μm of the outer perimeter thereof; and the difference between the refractive index of the core at its outer perimeter and the average refractive index of the region of the optical fiber outside of the core and within 5 μm of the outer perimeter thereof is no more than about $0.3\Delta n_{max}$. The concentration of aluminum can be graded in the core from a maximum level at or near the geometrical center of the core to a substantially lower value at the outer perimeter of the core. The concentration of fluorine and/or boron can be graded in the core from a minimum level at or near the geometrical center of the core to a substantially higher value at the outer perimeter of the core. The concentration of aluminum can be substantially constant throughout the core. The core can be doped with aluminum. The core can be co-doped with fluorine and/or boron. At least part of the core can be doped with both phosphorus and aluminum. The concentration of phosphorus, aluminum, or both can vary radially in the core. The cladding can be doped with germanium. The cladding can be co-doped with boron and/or fluorine.

The core can have an average radius in the range of about 6 μm to about 25 μm. The cladding can be substantially free of rare earth. In certain practices of the invention, any region of the optical fiber in which a rare earth is doped can be substantially free of germanium. The rare earth can comprise ytterbium. The rare earth can comprise erbium, alone or in combination with ytterbium.

In yet an additional aspect, the invention can provide an optical fiber for the propagation of optical radiation having an optical wavelength, where the optical fiber can comprise a core having a geometrical center and an outer perimeter; a cladding surrounding the core; wherein the core is doped with aluminum and a refractive index-reducing dopant; and the optical fiber has a refractive index profile such that the core is guiding for optical radiation having the optical wavelength. The optical fiber and optical wavelength can have an SBS acoustic wavelength associated therewith, and the optical fiber can have an acoustic index profile such that the core is antiguiding for an acoustic wave having the SBS acoustic wavelength. The core can be rare earth doped and substantially free of germanium. The core can have a graded refractive index.

In yet another aspect, the invention can provide an optical fiber for the propagation of optical radiation having an optical wavelength, where the optical fiber can comprise a core having a geometrical center and an outer perimeter and a cladding surrounding the core; the core can be doped with aluminum and phosphorus. The optical fiber can have a refractive index profile such that the core is guiding for optical radiation having the optical wavelength, and the optical fiber and optical wavelength can have an SBS acoustic wavelength associated therewith, and the optical fiber can have an acoustic index profile such that the core is antiguiding for an acoustic wave having the SBS acoustic wavelength. The core can be rare earth doped and substantially free of germanium. The core can have a radially-varying concentration of phosphorus. The core can have a graded refractive index.

Yet another aspect of the invention is a high power optical fiber device comprising an optical fiber as described above, and a pump source operatively coupled to the optical fiber.

Any of the features described above in conjunction with any one aspect described above can be combined with a practice of the invention according to any other of the aspects described above, as is evident to one of ordinary skill who studies the disclosure herein.

DETAILED DESCRIPTION OF THE INVENTION

Figure 1:
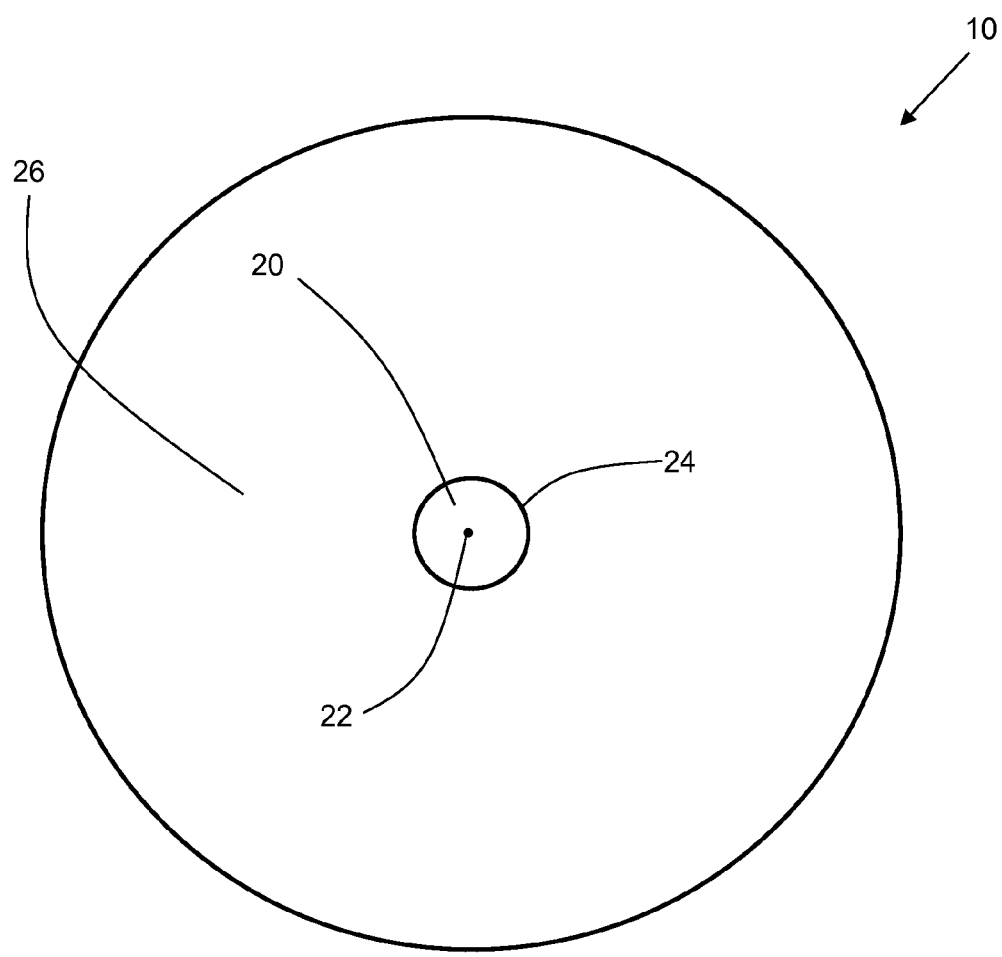
FIG. 1 is a schematic cross-sectional view of an optical fiber according to one embodiment of the invention.

SBS can be described classically as a parametric interaction of a pump wave (e.g., the forward propagating electromagnetic energy launched at the input end of an optical fiber), a Stokes wave, and an acoustic wave. The input electromagnetic energy generates an acoustic wave through the process of electrostriction which in turn causes a periodic modulation of the optical refractive index (e.g., forming a grating). The grating scatters the input electromagnetic energy via the process of Bragg diffraction back toward the input end. The scattered electromagnetic energy is down-shifted in frequency because of a Doppler shift associated with the grating, which moves at an acoustic velocity. The same scattering process can also be viewed quantum mechanically as if annihilation of a photon of the input electromagnetic energy creates a Stokes photon and an acoustic phonon simultaneously. Due to the nature of the scattering process, the Stokes wave is down shifted in frequency and the maximum Stokes intensity is in the backward direction. "Acoustic," as used herein, refers to a wave phenomenon (e.g., a longitudinal wave or a shear wave) understood by those of ordinary skill in the art to be related to SBS, and is not to be limited in the sense of relating only to sounds heard by humans.

The downward frequency shift $v_B$ of the scattered optical wave is inversely proportional to the wavelength of the transmitted or pump electromagnetic energy. In bulk silica, $v_B$ is approximately 16.2 GHz at a wavelength of 1.06 μm. The Brillouin gain spectrum is Lorentzian in shape, with the peak gain coefficient $g_B$ given by equation (1):

$$g_B(v_B) = \frac{2\pi n^7 p_{12}^2}{c\lambda_p^2 \rho_0 v_A \Delta v_B} \quad (1)$$

where n is the index of refraction at the pump wavelength $\lambda_p$, $p_{12}$ is the longtidinal elasto-optical coefficient, $\rho_0$ is the material density, $v_A$ is the acoustic velocity and $\Delta v_B$ is the full width at half maximum (FWHM) gain line width of the Brillouin spectrum. The gain line width $\Delta v_B$ is inversely proportional to the acoustic phonon lifetime $T_B$. The peak gain coefficient $g_B$ is nearly independent of wavelength because the gain line width $\Delta v_B$ also follows an inverse square relation with wavelength. For bulk silica, the peak gain coefficient $g_B$ is around $5\times10^{-11}$ m/W. In optical fiber, this value varies with the composition and index profile, as well as the acoustic guiding characteristics. Typical index variations between the core and cladding of an optical fiber can result in $n^7$ being lowered by 10-15%. However, the index levels are often restricted by other optical considerations of the transmission system. Typical compositional differences result in small changes in density and acoustic velocity. The Brillouin gain also depends on the pump source line width. In case of a Lorentzian pump spectrum of width $\Delta v_p$, the peak gain coefficient is given by equation (2):

$$\tilde{g}_B = \frac{\Delta v_B}{\Delta v_B + \Delta v_p} g_B(v_B) \quad (2)$$

One way to lower the gain coefficient is to change the spectral format of the pump source (e.g., broaden $\Delta v_p$). Often, it may not be possible to change the spectral format, or the power throughput is too high even at fairly high values of $\Delta v_p$. Hence, options are useful that improve the gain coefficient of the fiber itself, rather than controlling the source.

The terms "light" or "optical", as used herein, are used broadly as understood by one of ordinary skill in the art of optical waveguides, and are not to be limited as pertaining only to the visible range of wavelengths.

The term "antiguiding", as used herein, means that a wave launched into a core so described tends to be substantially excluded therefrom relative to the surrounding cladding. As used herein, the "acoustic index" ("AI") is defined as the ratio of the longitudinal velocity of an acoustic wave in pure silica to the longitudinal velocity of the equivalent acoustic wave in the material of interest.

Figure 2:
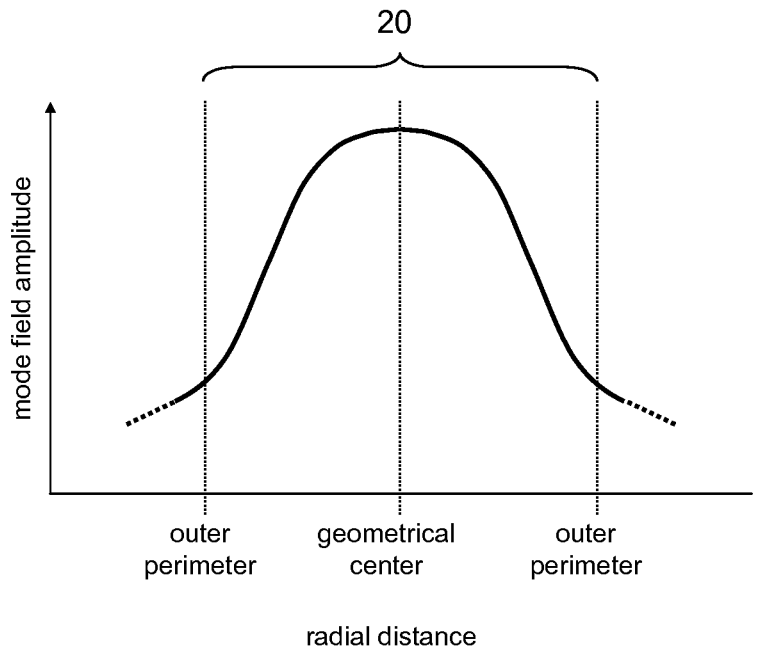
FIG. 2 is a schematic view of an optical mode field distribution of an optical fiber according to one embodiment of the invention.
Figure 3:
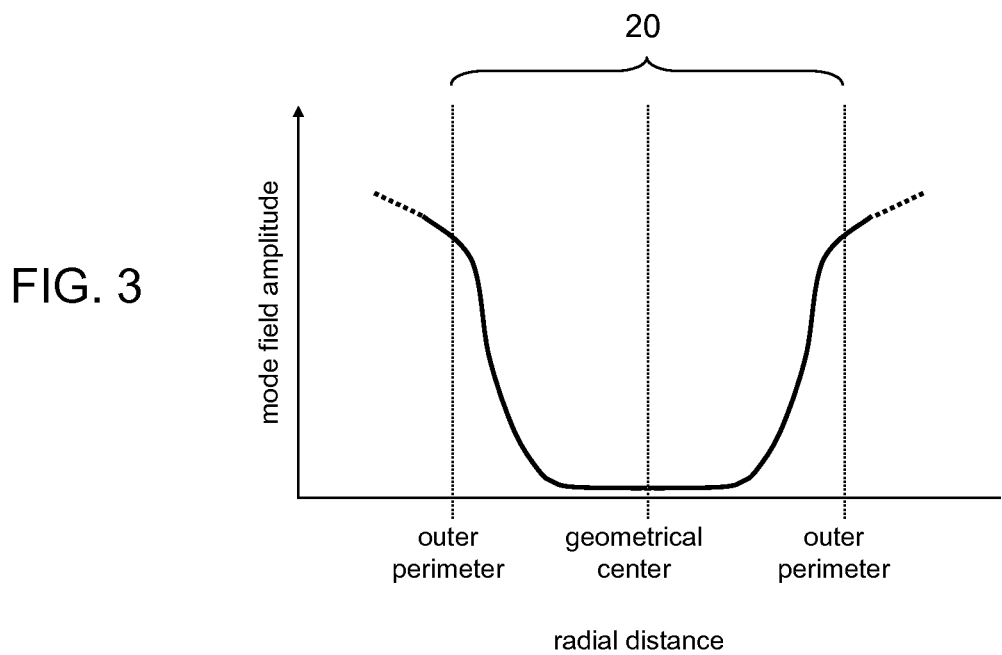
FIG. 3 is a schematic view of an acoustic mode field distribution of an optical fiber according to one embodiment of the invention.

An optical fiber according to one embodiment of the invention is shown in schematic cross-sectional view in FIG. 1. The optical fiber 10 can propagate optical radiation having an optical wavelength. The optical fiber and the optical wavelength have associated with them an SBS acoustic wavelength. That is, when high power radiation having the optical wavelength propagates in the optical fiber, an acoustic wave can be generated through stimulated Brillouin scattering as described above. The acoustic wavelength of the fundamental longitudinal acoustic wave so generated is the SBS acoustic wavelength associated with the optical fiber and the optical wavelength. Optical fiber 10 has a rare earth doped core 20, which has a geometrical center 22 and an outer perimeter 24, as well as a cladding 26 surrounding the core 20. The cladding 26 comprises an inner perimeter that, in the embodiment of FIG. 1, is coextensive with the outer perimeter 24 of the core 20. In this embodiment of the invention, the core 20 is rare earth doped and substantially free of germanium. Radial optical mode field and acoustic mode field distributions in the neighborhood of the core are shown in FIGS. 2 and 3, respectively, for an example of an optical fiber according to this embodiment of the invention. The optical fiber has a refractive index profile such that the core 20 is guiding for optical radiation having the optical wavelength, for example as shown in FIG. 2. The optical fiber has an acoustic index profile such that the core 20 is antiguiding for an acoustic wave having the acoustic wavelength, as shown in FIG. 3.

Figure 4:
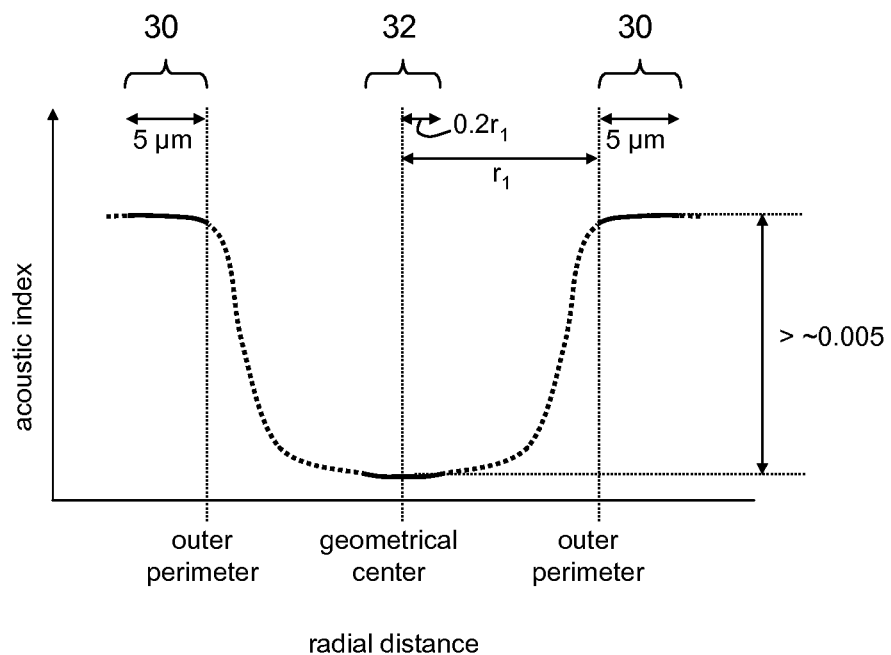
FIG. 4 is an acoustic index profile of an optical fiber according to one embodiment of the invention.

In one embodiment of the invention, the region of the fiber outside of the core 20 and within 5 μm of the outer perimeter of the core has an average acoustic index at least about 0.005 greater than the average acoustic index of the region of the core lying no more than 20% of the average core radius from the geometrical center 22 of the core 20. The cross sectional area of the core 20 is the area within the outer perimeter 24. The average core radius is that radius selected to yield a value for the cross sectional area for the core that is the same as that defined by the outer perimeter 24, where the cross sectional area of the core is determined to the formula π×(average radius)². For the circular outer perimeter 24 shown in FIG. 1, the average radius is simply the radius of the circular outer perimeter; however the outer perimeter of the core 20 need not, in all cases, be circular and have a constant radius. The acoustic index profile for an optical fiber according to this embodiment of the invention is shown in FIG. 4. In the acoustic index profile of FIG. 4, the region of the fiber outside of the core 20 and within 5 μm of the outer perimeter of the core is denoted with reference numeral 30. The region of the core lying no more than 20% of the average core radius from its geometrical center is denoted with reference numeral 32. Region 30 has an average acoustic index (i.e., at the SBS acoustic wavelength) at least about 0.005 greater than that of region 32. In certain embodiments of the invention, the region of the cladding within 5 μm of the outer perimeter of the core has an average acoustic index at least about 0.01 greater, or even about 0.015 greater than the average acoustic index of the region of the core lying no more than 20% of the average core radius from its geometrical center.

Figure 5:
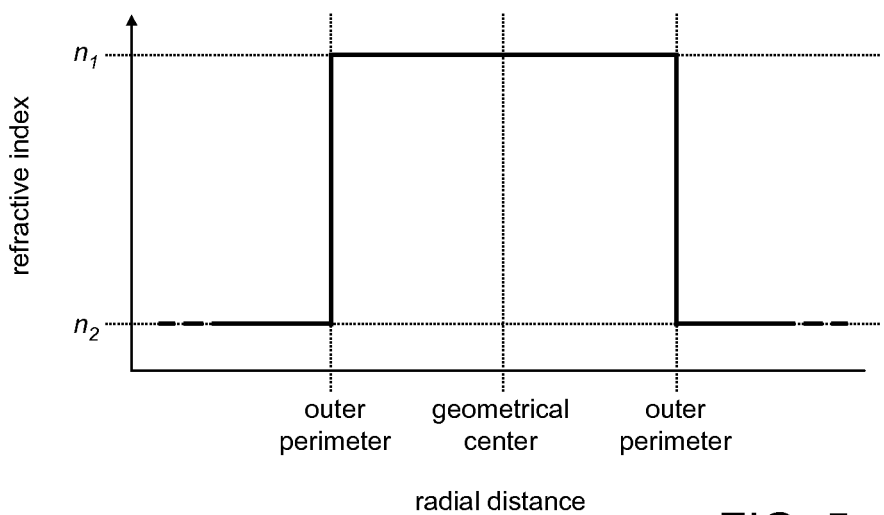
FIG. 5 is a refractive index profile of an optical fiber according to one embodiment of the invention.

As described above, the core of the optical fiber is guiding for optical radiation having the optical wavelength. The numerical aperture of the optical fiber can be, for example, in the range of about 0.01 to about 0.06. In certain embodiments of the invention, the core can have a numerical aperture of no greater than about 0.12, no greater than about 0.09, no greater than about 0.07, or even no greater than about 0.05. For example, the numerical aperture of the optical fiber can be in the range of about 0.03 to about 0.26. In certain embodiments of the invention, the numerical aperture of the optical fiber is in the range of about 0.12 to about 0.26, typical values for an optical fiber of the invention used as a beam delivery fiber. In other embodiments of the invention, the numerical aperture of the core can be in the range of about 0.04 to about 0.12, or about 0.05 to about 0.11. In other embodiments, the numerical aperture of the core is no more than about 0.07, or no more than about 0.08, or no more than about 0.09. FIG. 5 shows the refractive index profile of an optical fiber according to one embodiment of the invention. The refractive index profile of FIG. 5 is a step index profile, and can be similar to that of many conventional optical fibers. In FIG. 5, $n_1$ and $n_2$ are the indices of refraction (measured at the optical wavelength) of the core and cladding respectively. The numerical aperture can be calculated as $\sqrt{n_1^2 - n_2^2}$ for the step index refractive index profile of FIG. 5. The refractive index profile of FIG. 5 is idealized, and is but one example of a suitable refractive index profile. As is known in the art, there is wide range of refractive index profiles which are used for optical fibers, including, for example, step index profiles, power law index profiles and parabolic index profiles, as well as more complex profiles; numerical aperture calculations are available for these profiles as well. The refractive index profile shown in FIG. 5 is idealized in that it does not show the signature "center dip" that can be present when the optical fiber is made using the Modified Chemical Vapor Deposition (MCVD) process, and in that it shows ideally sharp index transitions between core and cladding.

In certain embodiments of the invention, the region of the core lying no more than 20% of the average core radius from its geometrical center has an average refractive index at least about 0.0002 greater than that of the region of the fiber outside of the core and lying within 5 μm of the outer perimeter of the core. For example, the average refractive index of the region of the core lying no more than 20% of the average core radius from its geometrical center can have an average refractive index at least about 0.0005, or even at least about 0.001 greater than that of the region of the optical fiber outside of the core and lying within 5 μm of the outer perimeter of the core.

In certain embodiments of the invention, the region of the core lying no more than 20% of the average core radius from its geometrical center has an average refractive index no more than about 0.01 greater than average refractive index of the cladding. For example, the average refractive index of the region of the core lying no more than 20% of the average core radius from its geometrical center can have an average refractive index no more than about 0.007, or even no more than about 0.005 greater than that of the cladding.

As described above, the core of optical fiber can be rare earth doped, i.e., doped with an element having an atomic number in the range 57 to 71. The rare earth can be selected so as to provide light of a first wavelength responsive to being pumped by light of a second wavelength that is different than the first wavelength. The core can be doped with, for example, ytterbium. In some embodiments of the invention, the core is doped with erbium, or both ytterbium and erbium. In other embodiments of the invention, the core can be doped with one or more other rare earths, such as thulium or neodymium. The rare earth can be doped throughout the core, or in other embodiments can be doped only in a certain region of the core (e.g., a central region).

Figure 6:
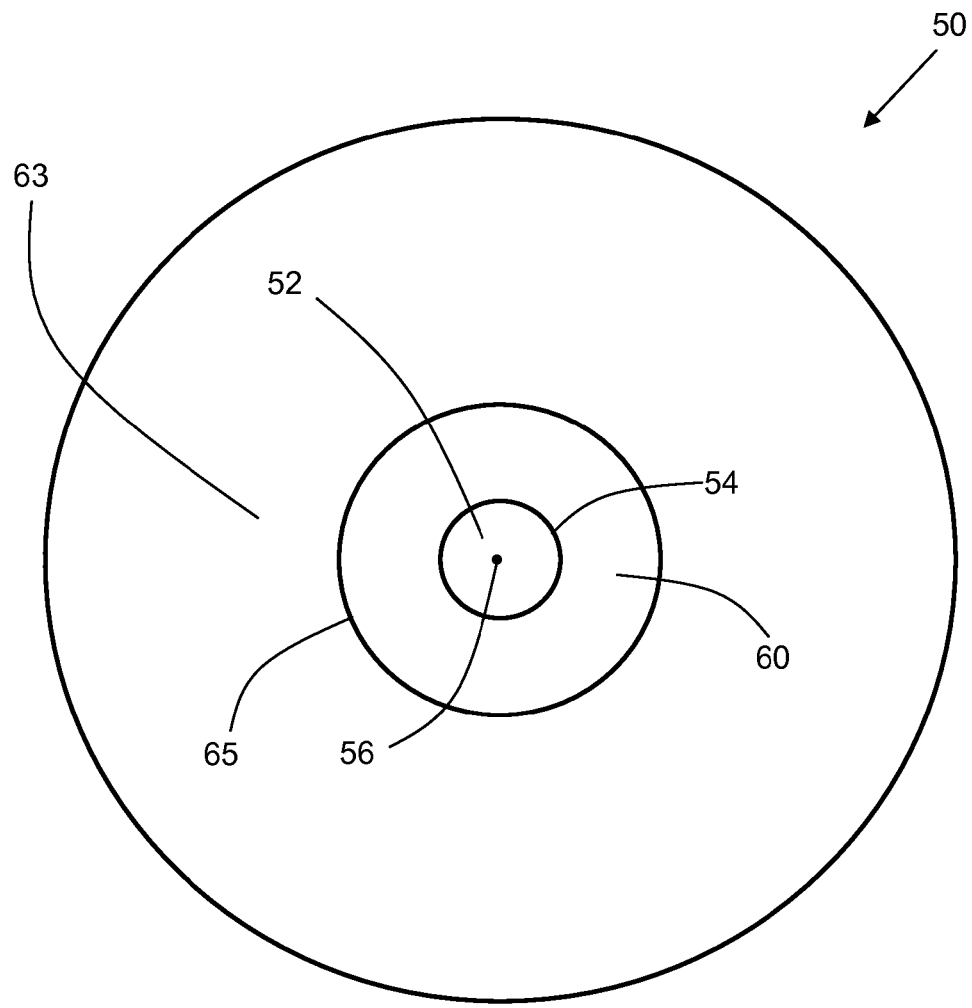
FIG. 6 is a schematic cross-sectional view of an optical fiber according to one embodiment of the invention.

In some embodiments of the invention, the optical fiber further comprises a second cladding immediately surrounding the cladding and having an inner perimeter. A cross-sectional view of an optical fiber according to this embodiment of the invention is shown in FIG. 6. Optical fiber 50 has a core 52, which has an outer perimeter 54, and a geometrical center 56; a cladding 60 immediately surrounding the core 52, and a second cladding 63 immediately surrounding the cladding 60 and having an inner perimeter 65. The cladding and the region of the second cladding lying within 10 μm of its inner perimeter can differ in refractive index profile, in acoustic index profile, or both.

Figure 7:
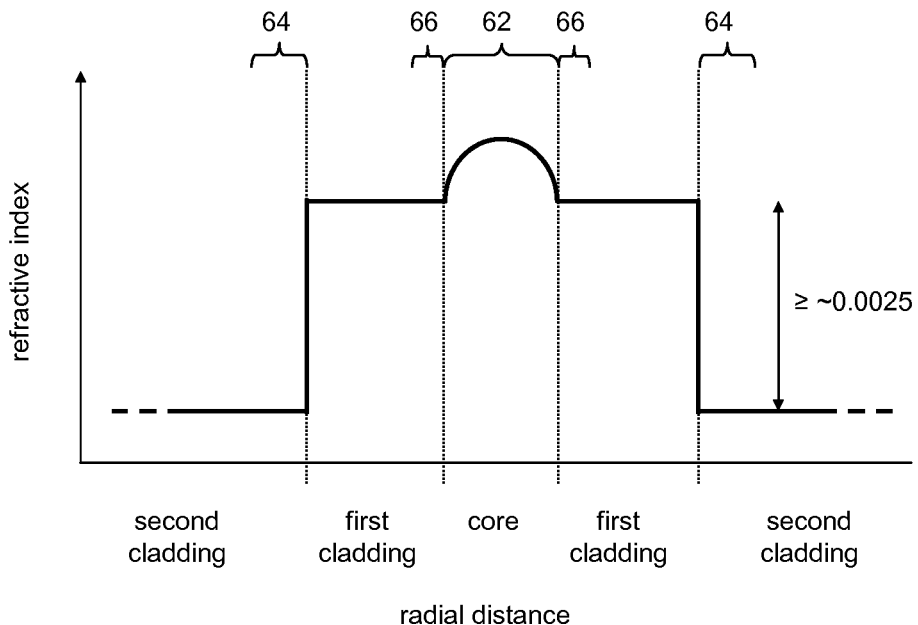
FIG. 7 is a refractive index profile of an optical fiber according to one embodiment of the invention.

In certain embodiments of the invention, the region of the cladding lying outside of the core and within 5 μm of the outer perimeter of the core has an average refractive index greater than that of the region of the second cladding lying within 10 μm of its inner perimeter. A refractive index profile of an optical fiber according to such an embodiment of the invention is shown in FIG. 7, in which the region of the optical fiber lying outside of the core and within 5 μm of the outer perimeter of the core is denoted with reference numeral 66, and the region of the second cladding lying within 10 μm of its inner perimeter is denoted with reference numeral 64. Region 66 has a higher average refractive index (i.e., at the optical wavelength) than that of region 64. The difference between the average refractive index of the region of the optical fiber lying outside of the core and within 5 μm of the outer perimeter of the core and the average refractive index of the region of the second cladding lying within 10 μm of its inner perimeter can be, for example, at least about 0.0005, at least about 0.001, or even at least about 0.0025 (as shown in FIG. 7). In these embodiments of the invention, the cladding can provide a so-called refractive index "pedestal", providing the optical fiber a relatively low numerical aperture.

Figure 8:
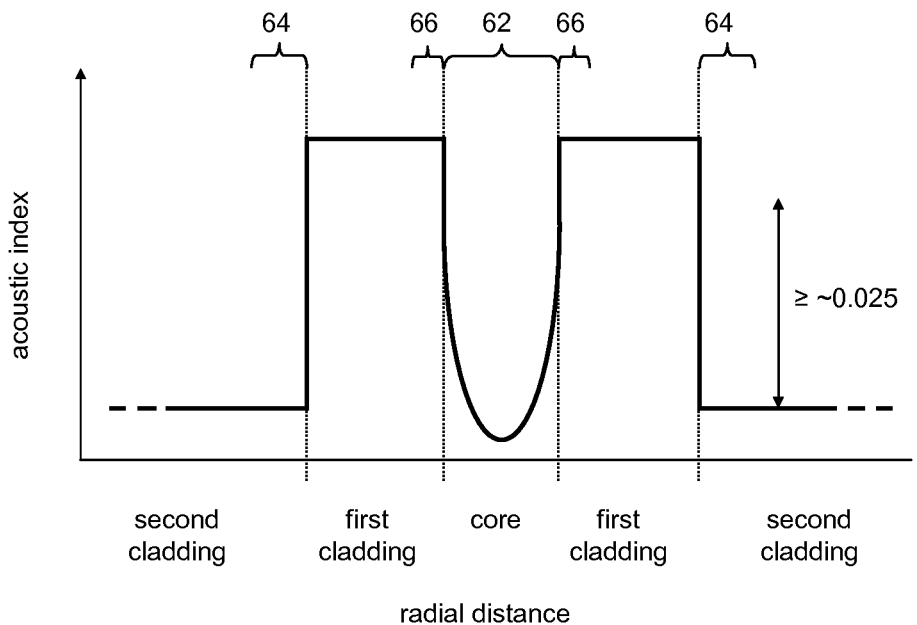
FIG. 8 is an acoustic index profile of an optical fiber according to one embodiment of the invention.

In certain embodiments of the invention, the region of the optical fiber lying outside of the core and within 5 μm of the outer perimeter of the core has an average acoustic index greater than that of the region of the second cladding lying within 10 μm of its inner perimeter. An acoustic index profile of an optical fiber according to such an embodiment of the invention is shown in FIG. 8, in which the region of the optical fiber lying outside of the core and within 5 μm of the outer perimeter of the core 62 is denoted with reference numeral 66, and the region of the second cladding lying within 10 μm of its inner perimeter is denoted with reference numeral 64. Region 66 has a higher average acoustic index (at the SBS acoustic wavelength) than that of region 64. The difference between the average refractive index of the region of the optical fiber lying outside of the core and within 5 μm of the outer perimeter of the core and the average refractive index of the region of the second cladding lying within 10 μm of its inner perimeter can be, for example, at least about 0.006, at least about 0.012, or even at least about 0.025 (as shown in FIG. 8). In these embodiments of the invention, the cladding can provide a confined acoustic mode with small overlap with the optical mode, and therefore can help to avoid the coupling of cladding acoustic modes with the optical mode.

In certain embodiments of the invention, the region of the optical fiber lying outside of the core and within 5 μm of the outer perimeter of the core has both an average acoustic index greater than that of the region of the second cladding within 10 μm of its inner perimeter, as described with respect to FIG. 8 above, as well as an average refractive index greater than that of the region of the second cladding lying within 10 μm of its inner perimeter, as described with respect to FIG. 7 above.

In embodiments of the invention in which the optical fiber includes both a cladding and a second cladding immediately surrounding the cladding, the cladding can have, for example, an average thickness in the range of about 5 μm to about 60 μm. In certain embodiments of the invention, the cladding has an average thickness in the range of about 10 μm to about 40 μm. In some embodiments of the invention, even more of the cladding (e.g., a region of the optical fiber lying outside of the core and within 10 μm of the outer perimeter of the core, or even a region of the optical fiber lying outside of the core and within 15 μm of the outer perimeter of the core) meets the average refractive index and/or average acoustic index limitations described herein.

As described above, the core of the optical fiber can be substantially free of germanium. For example, in certain embodiments of the invention, the core has an average germanium concentration of no more than about 0.05 wt % measured as $GeO_2$. The average germanium concentration of the core can be, for example, no more than about 0.01 wt %, or even no more than about 0.005 wt % measured as $GeO_2$.

In certain embodiments of the invention, the value of the normalized overlap integral between the electric field of the fundamental guided optical mode for the optical wavelength and the lowest order longitudinal acoustic field for the SBS acoustic wavelength ("the overlap integral") is no greater than about 0.75. The value of the overlap integral can be, for example, no more than 0.65 or even no more than 0.5. However, in certain embodiments of the invention, the value of the overlap integral is no less than about 0.05, no less than about 0.1 or even no less than about 0.2. While the overlap between acoustic and optical modes is desirably small, in some cases it is desirable to have a small amount of overlap to avoid acoustic cladding modes coupling back to the core and causing SBS. Overlap integrals are described in more detail, for example, in U.S. Patent Application Publication no. 2007/0116416, and in Li et al., "Al/Ge co-doped large mode area fiber with high SBS threshold", Optics Express 15(13), 8290, 25 Jun. 2007.

In one embodiment of the invention, the core consists essentially of a first region that includes the geometrical center, and a second region immediately surrounding the first region and extending to the outer perimeter of the core. In this embodiment of the invention, the core has a $\Delta n_{max}$ that is the difference between the maximum refractive index of the core and the average refractive index of the region of the cladding within 5 μm of the outer perimeter of the core. The difference between the average refractive indices of the first region of the core and the second region of the core is no more than about $0.5\Delta n_{max}$. For example, the difference between the average refractive indices of the first region of the core and the second region of the core can be no more than about $0.35\Delta n_{max}$, or even no more than about $0.2\Delta n_{max}$. In this embodiment of the invention, the core has a $\Delta AI_{max}$ that is the difference between the average acoustic index of the region of the cladding within 5 μm of the outer perimeter of the core and the minimum acoustic index of the core. The difference between the average acoustic indices of the first region of the core and the second region of the core is no less than about $0.5\Delta AI_{max}$. For example, the difference between the average refractive indices of the first region of the core and the second region of the core can be no less than about $0.65\Delta AI_{max}$, or even no less than about $0.8\Delta AI_{max}$. An optical fiber according to this embodiment of the invention can be, for example, a step-index fiber. In other embodiments of the invention, the optical fiber is a graded index fiber. In such embodiments, there may not be a clear demarcation between the first region and the second region of the core; the person of ordinary skill in the art can nonetheless identify first and second regions for which the limitations described herein are met. In certain embodiments of the invention, the second region has a thickness no more than about 50% of the core radius, or even no more than about 30% of the core radius. In some embodiments of the invention, the second region has a thickness greater than about 5%, or even greater than about 10% of the core radius.

Figure 9:
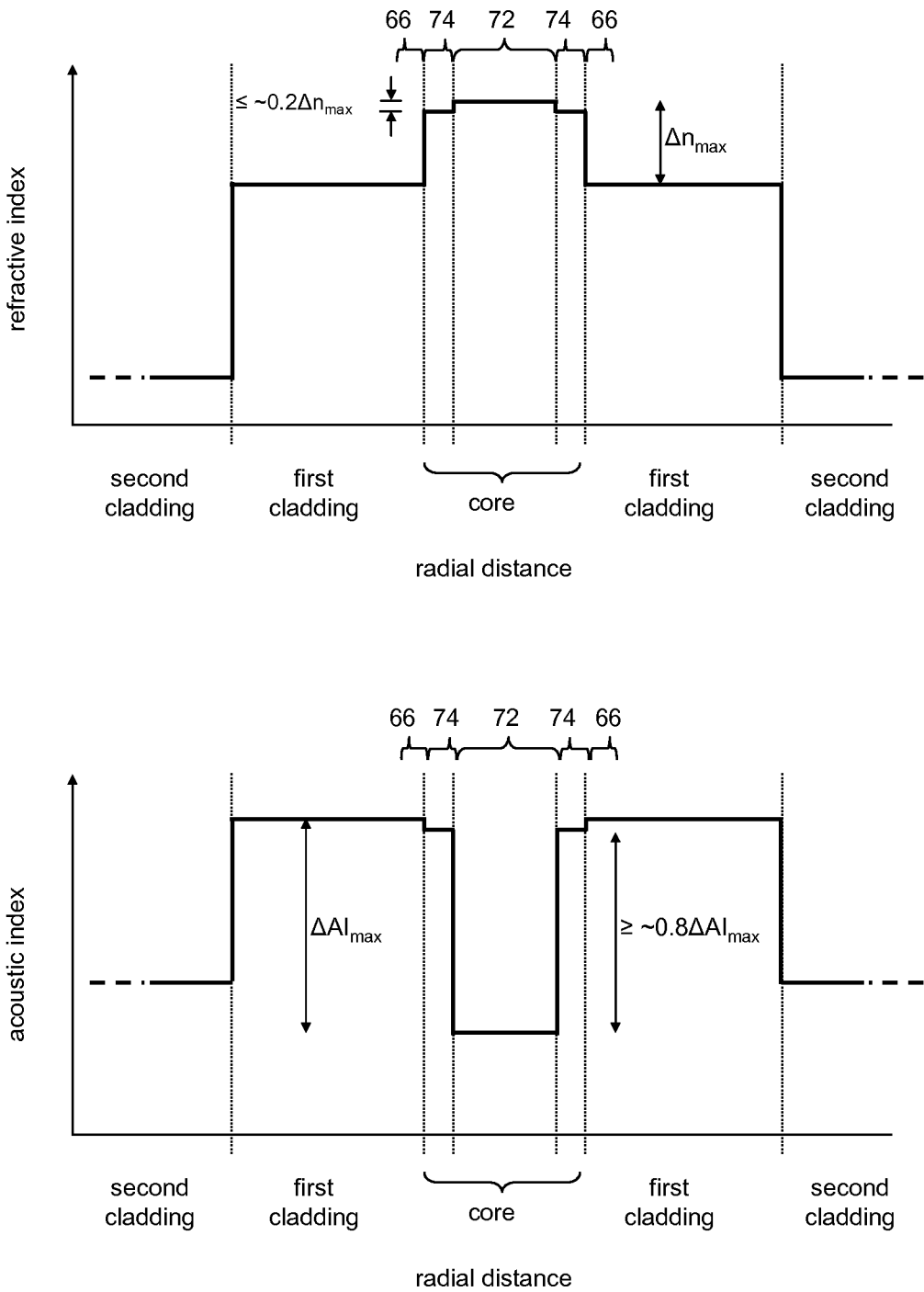
FIG. 9 is a refractive index profile and an acoustic index profile of an optical fiber according to one embodiment of the invention.

Refractive index and acoustic index profiles for a step index optical fiber according to one embodiment of the invention are provided in FIG. 9. In the refractive index and acoustic index profiles of FIG. 9, the first region of the core is denoted by reference numeral 72, and the second region of the core is denoted by reference numeral 74. The region of the optical fiber lying outside of the core and within 5 μm of the outer perimeter of the core is denoted by reference numeral 66. In the refractive index profile of FIG. 9, the difference between the average refractive indices of the first region of the core 72 and the second region of the core 74 is no more than about $0.2\Delta n_{max}$. In the embodiment shown in FIG. 9, the average refractive indices of the first region and of the second region are somewhat different; however, in other embodiments, they can be substantially similar. In the acoustic index profile of FIG. 9, the difference between the average acoustic indices of the first region and the second region is no less than about $0.8\Delta AI_{max}$. In the embodiment shown in FIG. 9, there is a small difference in the average acoustic indices of the second region of the core and of the region of the fiber within 5 μm of the outer perimeter of the core; in other embodiments of the invention however, the average acoustic indices of the second region of the core and of the region of the optical fiber within 5 μm of the outer perimeter of the core are substantially equal. In the embodiment shown in FIG. 9, the second region has a radial thickness of about 25% of the core radius. In this embodiment of the invention, the second region of the core has both a high refractive index and a high acoustic index, which allows the optical and acoustic modes to overlap a small amount, as described above.

Figure 10:
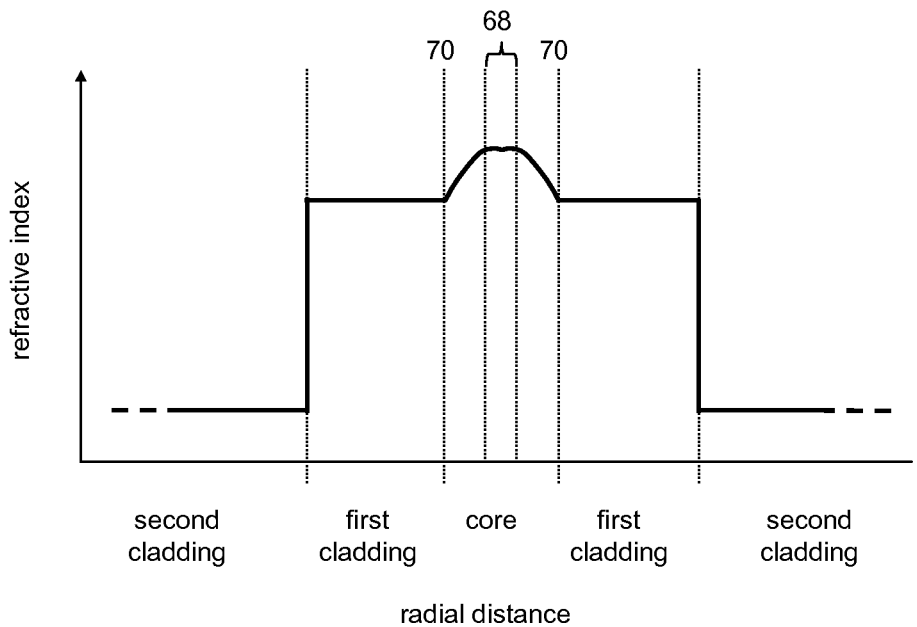
FIG. 10 is a refractive index profile and an acoustic index profile of an optical fiber according to one embodiment of the invention.
Figure 10:
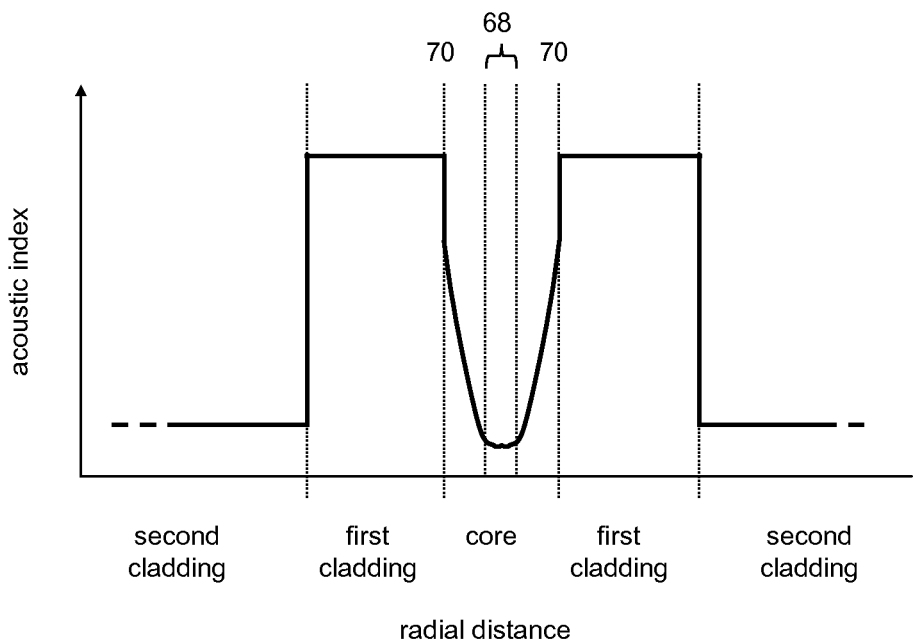

In one embodiment of the invention, the refractive and acoustic index profiles of the core are graded. The refractive index profile can be, for example, graded from a maximum value at or near the geometrical center of the core (e.g., in the region of the core lying no more than 20% of the average core radius from its geometrical center) to a substantially lower value at the outer perimeter of the core. The acoustic index profile can be, for example, graded from a minimum value at or near the geometrical center of the core (e.g., in the region of the core lying no more than 20% of the average core radius from its geometrical center) to a substantially higher value at the outer perimeter of the core. Refractive index and acoustic index profiles for an optical fiber according to this embodiment of the invention is shown in FIG. 10, in which the region of the core lying no more than 20% of the average core radius from its geometrical center is denoted by reference numeral 68, and the outer perimeter of the cladding is denoted by reference numeral 70. The refractive index profile of the core has a maximum refractive index value lying within 20% of the average core radius from the geometrical center of the core, and decreases outward to the outer perimeter of the core. The acoustic index profile of the core has a minimum acoustic index value lying within 20% of the average core radius from the geometrical center of the core, and increases outward to the outer perimeter of the core. In this embodiment of the invention, the graded refractive and acoustic index profiles can allow the optical and acoustic modes to overlap a small amount, as described above.

Grading of the refractive index profile (e.g., as a parabolic index profile or a power law index profile) can be advantageous in that it can favor the fundamental mode in a large mode area fiber, providing an additional degree of freedom for increasing the core size without sacrificing beam quality. In some embodiments of the invention, the index profile can be characterized by equation (3) below:

$$\Delta n_{ri} = [n_o(1-2\Delta(r_i/R)^m)^{1/2}] - n_{SiO2} \quad (3)$$

in which $\Delta n_{ri}$ is the change in refractive index from silica, $n_o$ is the maximum index at radial position $r_i=0$, $\Delta$ is $n_o-n_R$, $r_i$ is the radial distance, R is the core radius, m is the profile parameter, $n_{SiO2}$ is the refractive index of silica and $n_R$ is the refractive index at the outer perimeter of the core. In various embodiments of the invention the factor m can range from about 0 to about 10, from about 10 to about 20, from about 20 to about 30; from about 30 to about 40, from about 40 to about 50; from about 50 to about 60, from about 60 to about 70, or from about 70 to about 80. The larger effective area associated with the increased core size can further increase the SBS threshold. A graded refractive index profile can also help maintain the optical mode in the central region of the core, even in a coiled configuration.

In some embodiments of the invention, the core has a $\Delta n_{max}$ that is the difference between the maximum refractive index of the core and the average refractive index of the region of the optical fiber that is outside the core and within 5 μm of the outer perimeter of the core. The difference between the refractive index of the core at its outer perimeter and the average refractive index of the region of the fiber that is outside of the core and within 5 μm of the outer perimeter of the core can be, for example, no more than about $0.3\Delta n_{max}$, no more than about $0.2\Delta n_{max}$, or even no more than about $0.1\Delta n_{max}$. In some embodiments of the invention, the core has a $\Delta AI_{max}$ that is the difference between the average acoustic index of the region of the optical fiber outside of the core and within 5 μm of the outer perimeter of the core and the minimum acoustic index of the core.

In the embodiments illustrated in FIGS. 9 and 10, the minimum acoustic index of the core is less than the acoustic index of the second cladding. In other embodiments of the invention, the minimum acoustic index of the core can be substantially equal to the acoustic index of the second cladding, or even somewhat higher than the acoustic index of the second cladding.

Moreover, in the embodiments described above with respect to FIGS. 9 and 10, the optical fiber includes both a cladding and a second cladding, as described above. In certain embodiments of the invention as described with respect to FIGS. 9 and 10, the second cladding is optional; in some embodiments of the invention, the second cladding is not present.

In light of the present disclosure, the person of ordinary skill in the art can use standard optical fiber materials and processes to make the optical fibers of the present invention. For example, the core and cladding(s) of an optical fiber of the present invention can be formed from silica-based materials. The dopants of the core and/or cladding(s) can be selected to provide the desired refractive and acoustic index profiles. For example, the core can be doped, for example, with one or more of aluminum, phosphorous and/or fluorine as dopants. Similarly, the cladding(s) can be doped with germanium, fluorine and/or boron, among others. A part of a fiber, such as the cladding, can be of a photonic bandgap or holey design, or can include voids that macroscopically reduce the effective index of refraction by lowering the average index of refraction of the region including the voids.

In certain embodiments of the invention, the core and cladding(s) are formed from variably-doped silica. Different dopants have different effects on the refractive and acoustic indices of doped silica. For example, germanium, phosphorus and titanium increase both the refractive index and acoustic index of silica. Fluorine and boron decrease the refractive index and increase the acoustic index of silica. Aluminum increases the refractive index and decreases the acoustic index of silica. The effect of dopant concentration on refractive index of doped silica is well-known in the art, and can be approximated using standard techniques. The effect of dopant concentration on the acoustic index of doped silica can, for example, be approximated using equations (4) and (5) below:

$$n_a = \frac{V_{L,SiO_2}}{V_{L(r)}} \quad (4)$$

$$V_{L(r)} = V_{L,SiO_2} + \sum (\Delta V_{L,i} X_i), \quad (5)$$

in which $n_a$ is the estimated acoustic index, $V_{L,SiO_2}$ is the longitudinal velocity of undoped silica (e.g., 5944 m/s), $V_{L(r)}$ is the longitudinal velocity at the position of interest, $\Delta V_{L,i}$ is the change in longitudinal velocity per unit wt % of dopant, and $X_i$ is the weight percent of dopant species i. Table 1 provides $\Delta V_{L,i}$ values for a variety of dopants, for which dopant concentration is measured as the species listed in Table 1 (i.e., germanium is measured as wt % $GeO_2$, and fluorine is measured as wt % F).

TABLE 1

| I | $GeO_2$ | $Al_2O_3$ | $P_2O_5$ | F | $TiO_2$ | $B_2O_3$ |
|---|---|---|---|---|---|---|
| $\Delta V_{L,i}$ (m/s) | −27.94 | 24.96 | −18.43 | −213.98 | −35.07 | −73.11 |

Of course, as the person of ordinary skill in the art will appreciate, use of multiple dopants may in certain circumstances cause some deviation from the acoustic index values determined using equations (4) and (5) and Table 1. See also C. K. Jen et al., "Role of guided acoustic wave properties in single-mode optical fibre design," Electronics Letters, Vol. 24, No. 23, pp. 1419-1420, Nov. 10, 1988.

As described above, the core of the optical fibers can be substantially free of germanium, and can be doped with a rare earth. In certain embodiments of the invention, any region of the optical fiber in which a rare earth is doped is substantially free of germanium. In one embodiment of the invention, the core of the optical fiber is doped with aluminum. Aluminum can provide both the relatively high refractive index necessary for guiding of optical radiation, and the relatively low acoustic index necessary for antiguiding of an SBS-generated acoustic wave. Advantageously, no germanium is necessary in the core of the optical fiber. In some embodiments of the invention, substantially all of the core is doped with aluminum. In other embodiments of the invention, only part of the core is doped with aluminum. The core can be co-doped (e.g., in an aluminum-containing region, in an aluminum-free region, or both; and in the same or separate regions) with additional dopants such as fluorine, phosphorus and/or boron.

In certain embodiments of the invention, at least part of the core is doped with both phosphorus and aluminum. While both phosphorus and aluminum are on their own refractive index increasing dopants, when together they act antagonistically, and tend to cancel out their respective refractive index contributions. For example, when present in a 1:1 ratio, there can be little overall refractive index contribution. When present in a ratio of other than 1:1, the cancellation can be present, but of course not complete, as the excess of one of the dopants over the other can cause a refractive index change. Use of both phosphorus and aluminum can provide both a desired acoustic index and a desired refractive index. For example, in one embodiment of the invention, the concentration of phosphorus, aluminum, or both can vary radially in the core, thereby providing a graded acoustic index profile and/or a graded refractive index profile. In certain embodiments of the invention, the concentration of aluminum is substantially constant in the core, and the concentration of phosphorus increases from a low (e.g., near zero) value at or near the geometric center of the core, and varies to an increased concentration at the outer perimeter of the core, thereby providing a graded refractive index and a graded acoustic index to the core.

In certain embodiments of the invention, the cladding is doped with germanium. Germanium can provide the cladding with a high acoustic index relative to the core, so that the core is antiguiding for the acoustic wave, and with a lower refractive index than the core, so that the core can be guiding for the optical radiation. Use of germanium in the cladding can provide the cladding with a refractive index only somewhat lower than the refractive index of the core, so that the optical fiber guides optical radiation with a relatively low numerical aperture. In some embodiments of the invention, the cladding is co-doped with germanium and fluorine and/or boron. As described above, germanium increases both the acoustic index and the refractive index in doped silica, while boron and fluorine increase the acoustic refractive index while decreasing the refractive index. In such embodiments, the person of ordinary skill can choose levels of germanium and fluorine and/or boron to provide a cladding with both the desired acoustic index and the desired refractive index. Use of germanium in the cladding, either alone or in combination with other dopants such as fluorine and/or boron, can provide a cladding that acts as a refractive index pedestal for the optically-guiding core.

Of course, in other embodiments of the invention, the cladding does not include germanium. Other dopants, such as titanium or phosphorus, can instead be used in the cladding to provide both relatively high refractive index and relatively high acoustic index.

As described with reference to FIG. 9, above, in certain embodiments of the invention the core consists essentially of a first region including the geometrical center, as described above, and a second region immediately surrounding the first region and extending to the outer perimeter of the core, in which the second region has an average acoustic index approaching the relatively high acoustic index of the cladding, and an average refractive index approaching the relatively high refractive index of the first region of the core. In one such embodiment of the invention, the second region of the core is doped with phosphorus. Phosphorus can provide both high refractive index and high acoustic index, making unnecessary the use of germanium in the second region of the core. The second region can optionally be co-doped with other dopants. For example, fluorine or boron can be used to reduce the refractive index while maintaining a high acoustic index, allowing the person of ordinary skill in the art to target both a desired refractive index and a desired acoustic index. In certain embodiments of the invention, the first region, but not the second region, is doped with aluminum.

As described above with reference to FIG. 10, above, in certain embodiments of the invention the refractive index and/or acoustic index profiles of the core are graded. Varying levels of dopants can be used to achieve the refractive and/or acoustic index grading. For example, in one embodiment of the invention, the concentration of aluminum can be graded in the core, from a maximum level at or near the geometrical center of the core to a substantially lower value at the outer perimeter of the core. In other embodiments of the invention, concentrations of other dopants, such as fluorine and/or boron are graded to achieve the desired acoustic and/or refractive index grading. For example, in one embodiment of the invention, the concentration of fluorine and/or boron is graded in the core from a minimum level at or near the geometrical center of the core to a substantially higher value at the outer perimeter of the core. The concentration of aluminum can, for example, be graded, as described above, or can be substantially constant throughout the core.

The core of an optical fiber according to the present invention can have any of a variety of sizes. For example, the core can have a radius (as measured from its geometrical center to its outer perimeter) of at least about 10 μm, at least about 15 μm, at least about 20 μm, at least about 25 μm, or even at least about 50 μm. In certain embodiments of the invention, the core has a radius in the range of about 6 μm to about 25 μm, or about 8 μm to about 17 μm.

The cladding of an optical fiber according to the present invention can have any of a variety of sizes. For example, when the cladding has a second cladding immediately surrounding it as described above, it can have an average radial thickness (as measured from the outer perimeter of the core to the inner perimeter of the second cladding) in the range of about 5 μm to about 60 μm, or about 10 μm to about 30 μm.

As described above, in certain embodiments of the invention the cladding has a second cladding immediately surrounding it. The region of the second cladding lying within 10 μm of its inner perimeter can have an average refractive index that is less than the average refractive index of the cladding. In such embodiments, the cladding can act as a pump cladding for receiving pump light for pumping the rare earth in the core. In certain embodiments of the invention, the cladding and the second cladding are substantially free of rare earth.

Another aspect of the invention is an optical fiber for the propagation of optical radiation having an optical wavelength. The optical fiber has a geometrical center and an outer perimeter; and a cladding immediately surrounding the core, as described above. In this aspect of the invention, the core is doped with aluminum and a refractive index-reducing dopant; and the optical fiber has a refractive index profile such that the core is guiding for optical radiation having the optical wavelength. In certain embodiments of the invention, the optical fiber and optical wavelength have an SBS acoustic wavelength associated therewith, and wherein the optical fiber has an acoustic index profile such that the core is antiguiding for an acoustic wave having the SBS acoustic wavelength. The core of the optical fiber can be, for example, rare earth doped and substantially free of germanium. In certain embodiments of the invention, the core of the optical fiber has a graded refractive index. Moreover, the optical fiber according to this aspect of the invention can have any of the features described above with respect to the first aspect of the invention.

Another aspect of the invention is an optical fiber for the propagation of optical radiation having an optical wavelength, the optical fiber comprising a core having a geometrical center and an outer perimeter; and a cladding immediately surrounding the core, as described above. In this aspect of the invention, the core is doped with aluminum and phosphorus; and the optical fiber has a refractive index profile such that the core is guiding for optical radiation having the optical wavelength. In certain embodiments of the invention, the optical fiber and optical wavelength have an SBS acoustic wavelength associated therewith, and wherein the optical fiber has an acoustic index profile such that the core is antiguiding for an acoustic wave having the SBS acoustic wavelength. The core of the optical fiber can be, for example, rare earth doped and substantially free of germanium. In certain embodiments of the invention, the core of the optical fiber has a graded refractive index. In some embodiments of the invention, the core has a radially-varying concentration of phosphorus. Moreover, the optical fiber according to this aspect of the invention can have any of the features described above with respect to the first aspect of the invention.

The optical fibers of the present invention can be useful with optical radiation of a variety of wavelengths. In certain embodiments of the invention, the optical fiber propagates optical radiation in the visible and/or infrared, for example at one or more wavelengths in the wavelength range 500 nm-2000 nm; or in the wavelength range 600 nm-1800 nm.

Certain exemplary refractive index profiles that can be useful in fibers according to the invention are shown above. These refractive index profiles are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the MCVD process (assuming that the MCVD process is used to fabricate the optical fiber preform). Also, in certain embodiments of the invention, each of the sections of the refractive index profile corresponding to a particular part of the fiber has a substantially constant index of refraction. This need not be true in all practices of the invention. As is well known in the art the index of refraction need not be constant. The index of refraction can be varied according to a predetermined function to provide a particular result. For example, it is known in the art to provide a core comprising a graded refractive index profile, where the profile corresponds to a parabola or other suitable function. As used herein, the use of open language (e.g., comprise, have, include, etc.) in conjunction with describing the index of refraction of a portion, or a propagation velocity of a portion, (e.g., a portion has an index of refraction n) does not mean that the specified feature of the portion need be constant throughout the portion.

The person of ordinary skill in the art can, based on the present disclosure, use any suitable method for manufacturing the optical fiber. An optical fiber is typically drawn from a solid preform, though "preform", as that term is used herein, is intended to include a crucible-type arrangement wherein a fiber is drawn from a mass of viscous material through an appropriate aperture or set of apertures. Any of a number of techniques, such as OVD, MCVD, flame hydrolysis and rod-in-tube can be used to make the preform from which the optical fiber is drawn. As the person of ordinary skill will appreciate, an optical fiber of the present invention can be coated with one or more polymeric coatings. An optical fiber of the present invention can also include one or more polarization-maintaining stress rods.

One of ordinary skill in the art understands that a material or element can be combined with or incorporated into another material, such as host material, according to a chemical formulation that depends on materials in question. For example, when the host material is silica glass, most of the germanium is understood to be typically incorporated as $GeO_2$. Similarly, it is understood that boron is typically incorporated as $B_2O_3$. However, the invention is not limited to glass hosts or silica glass hosts, and can be practiced with other types of materials as host, such as plastics or other types of glasses, such as chalcogenide glasses or fluoride or phosphate glasses, wherein germanium or other elements are incorporated into different compounds than those specifically noted above. Stating that a fiber includes a material, such as boron, for example, means that the material is included in some form in the fiber, where it is understood that the form can be different for different fiber optic articles.

Additional embodiments of the invention can include, at least in conjunction with any of the embodiments described above, the cladding immediately surrounding the core. Furthermore, in conjunction with any such additional embodiments, in place of the reference herein to the region of the fiber outside of the core and within a specified distance of the outer perimeter of the core (e.g., 5 μm) having one or more characteristics, reference can be made to the region of the cladding within the specified distance (e.g., 5 μm) of the inner perimeter of the cladding having the one or more characteristics.

The optical fibers of the present invention can be especially useful in high power optical fiber devices. For example, one aspect of the invention is a high power optical fiber device comprising an optical fiber as described above, and a pump source (e.g., a pump laser) operatively coupled to the optical fiber. High power optical devices according to this aspect of the invention include high power fiber lasers, amplifiers, and like devices.

Those of ordinary skill in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

The invention is further described by the following non-limiting Examples.

Example 1

Figure 11:
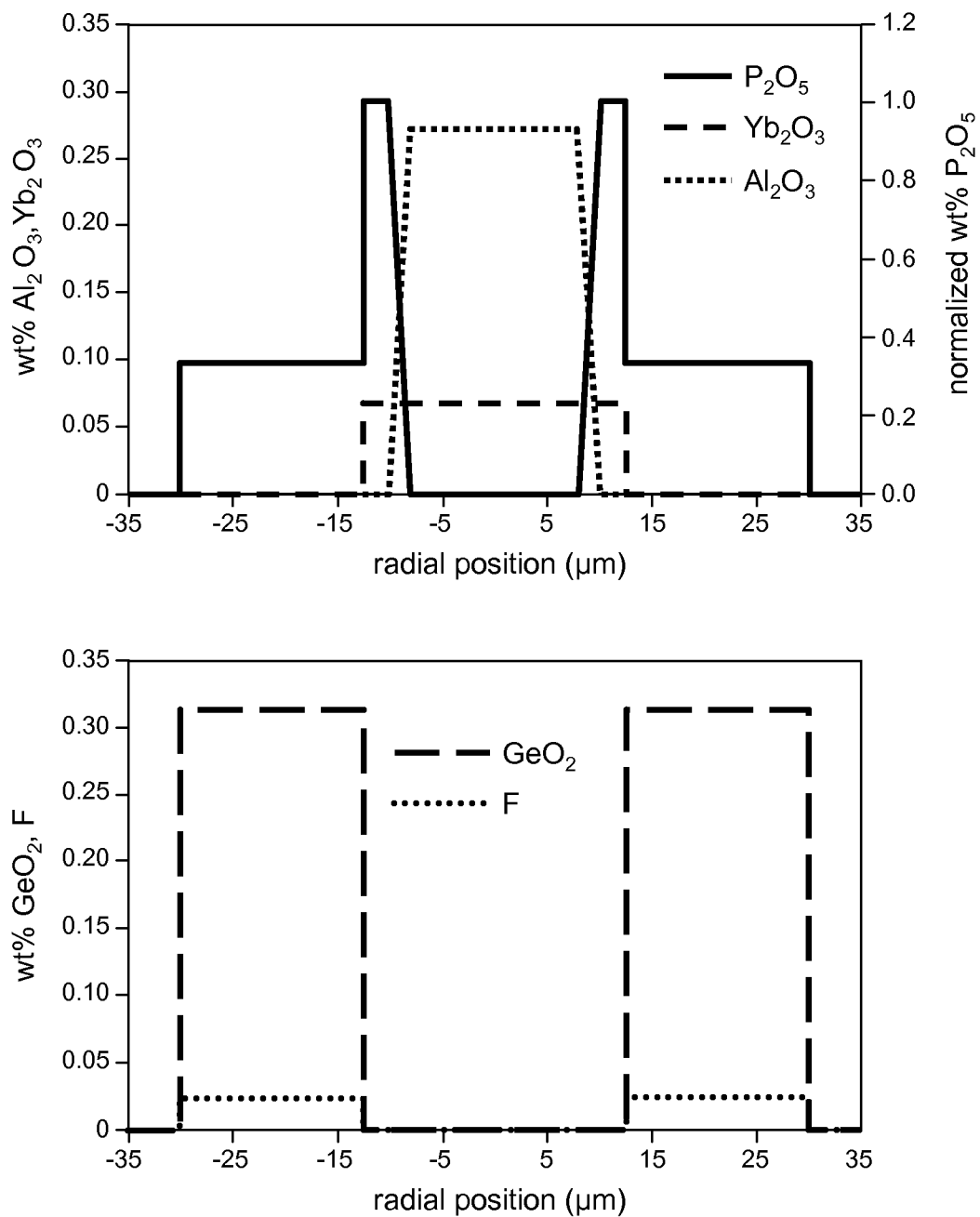
FIG. 11 is a dopant concentration profile of the optical fiber of Example 1.
Figure 12:
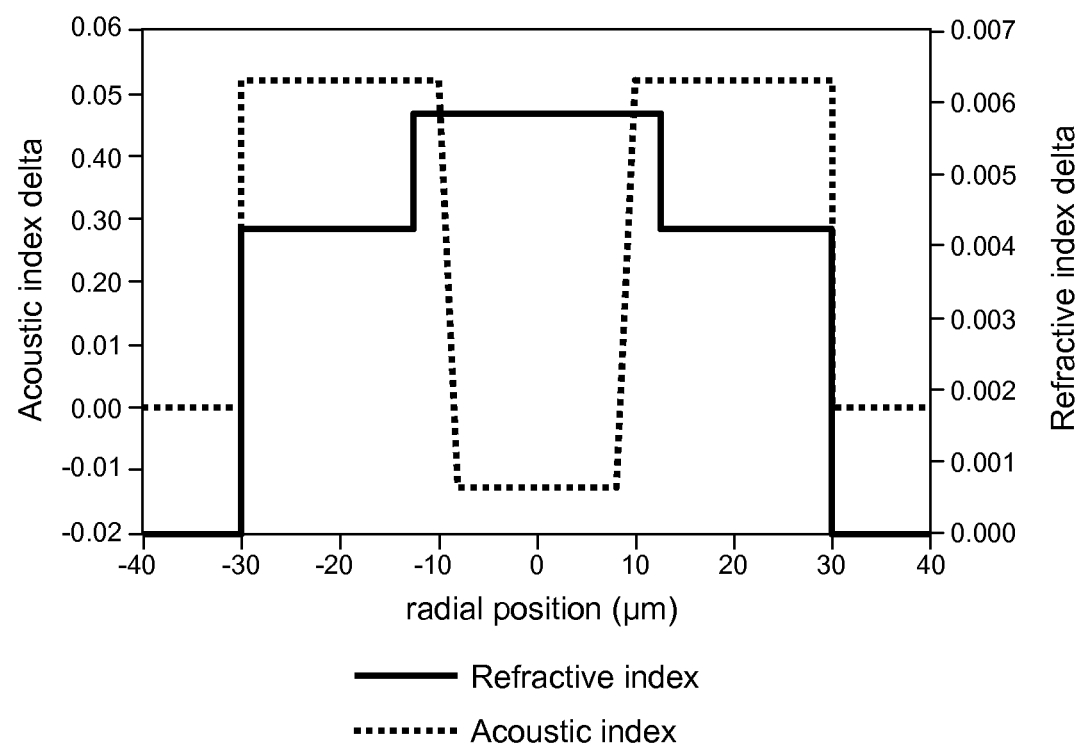
FIG. 12 is a refractive index profile and an acoustic index profile of the optical fiber of Example 1.

Dopant concentration profiles for an example of a step index fiber according to one embodiment of the present invention are presented in FIG. 11. In FIG. 11, dopant concentration profiles are presented in two separate graphs for clarity; the person of skill in the art will appreciate that the dopant concentration profiles of the two graphs are for a single fiber. The calculated refractive index and acoustic index profiles are presented in FIG. 12.

Example 2

Figure 13:
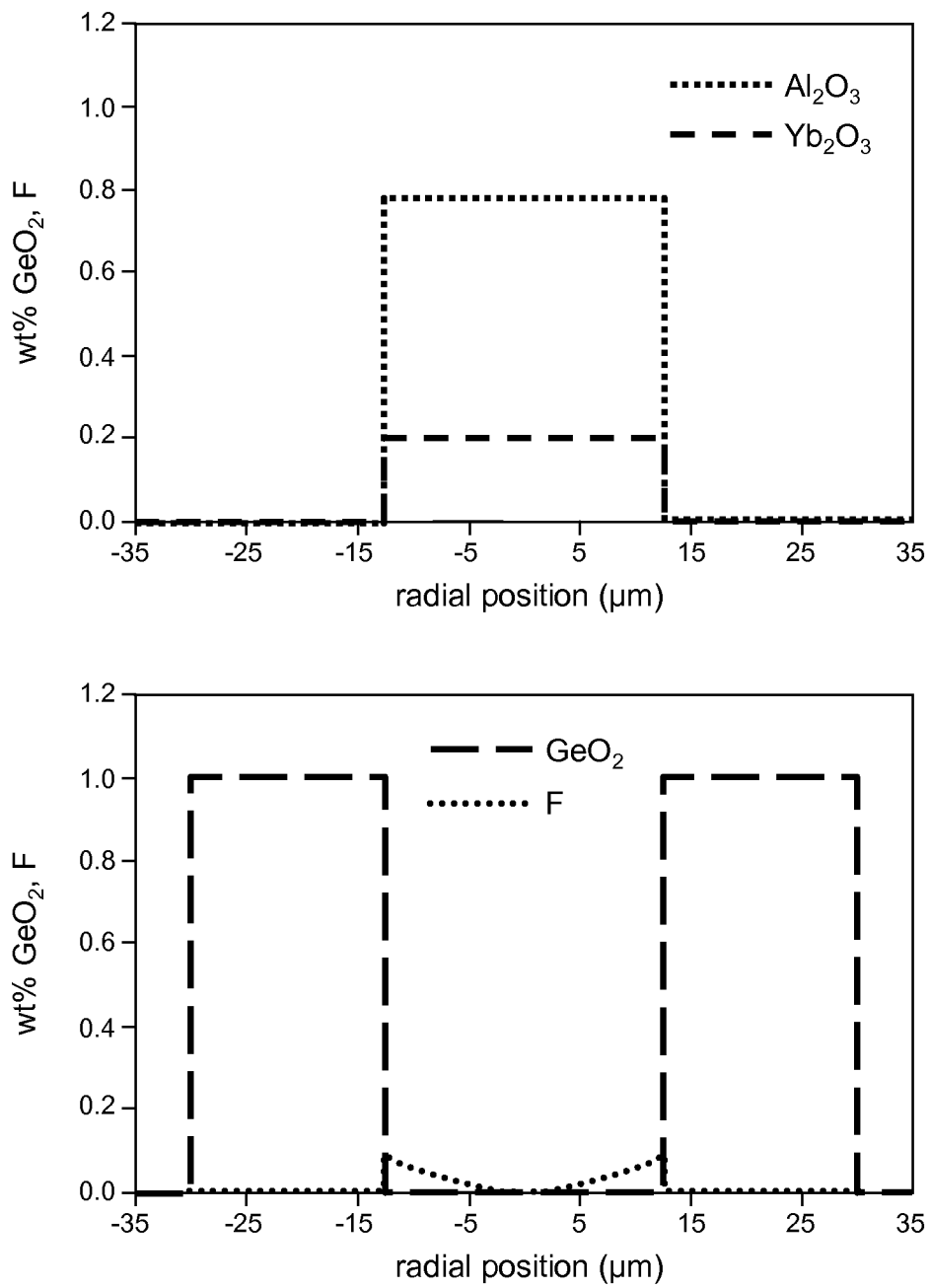
FIG. 13 is a dopant concentration profile of the optical fiber of Example 2.
Figure 14:
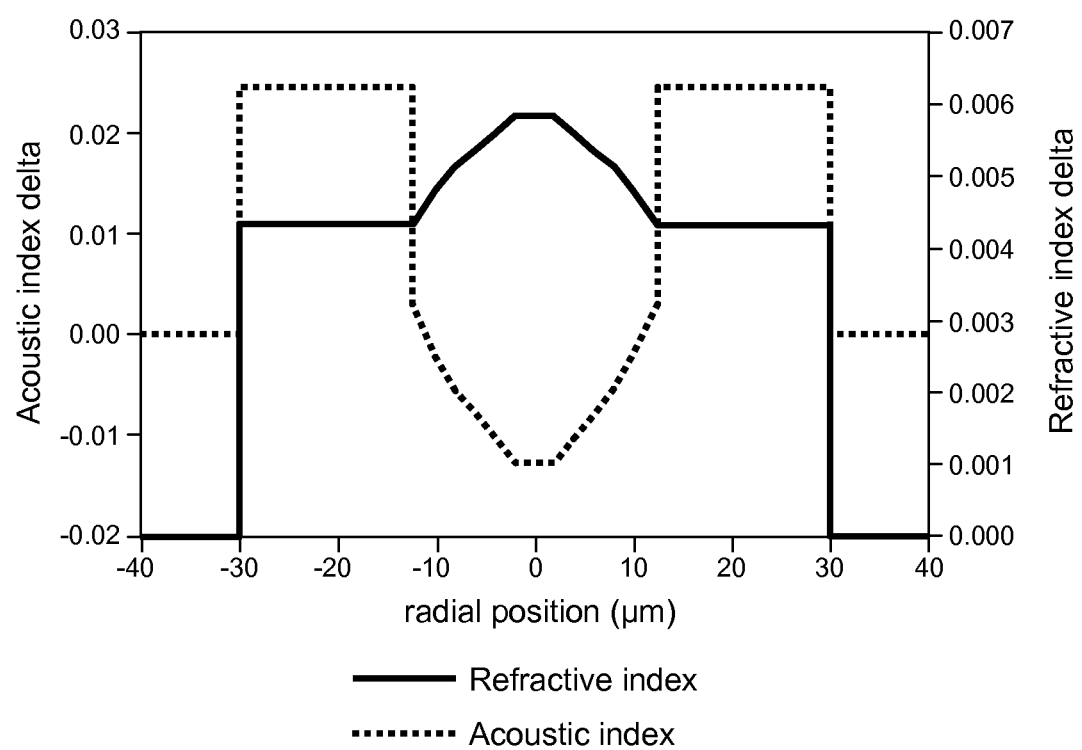
FIG. 14 is a refractive index profile and an acoustic index profile of the optical fiber of Example 2.

Dopant concentration profiles for an example of a step index fiber according to one embodiment of the present invention are presented in FIG. 13. In FIG. 13, dopant concentration profiles are presented in two separate graphs for clarity; the person of skill in the art will appreciate that the dopant concentration profiles of the two graphs are for a single fiber. The calculated refractive index and acoustic index profiles are presented in FIG. 14.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 8th Edition, 7th Revision.

It is understood that the use of the term "a", "an" or "one" herein, including in the appended claims, is open ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

For example, consider that it is disclosed that an optical fiber is initially etched along a length and then part or all of the etched length is bonded to a substrate. The phrase "said optical fiber including a length that is etched to have a reduced diameter, at least a part of said etched length bonded to said substrate", makes it clear that not all of the etched length need be bonded to the substrate. However, the phrase "an optical fiber having an etched length, said etched length being bonded to said substrate", also is not intended to require that all of the initially etched length be bonded to the substrate, regardless whether or not "at least a part of" is used in similar recitations elsewhere in the specification or claims or not.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. An optical fiber for the propagation of optical radiation having an optical wavelength, the optical fiber and optical wavelength having an SBS acoustic wavelength associated therewith, the optical fiber comprising
    a core having a geometrical center, an outer perimeter and an average radius that yields the cross sectional area of the core as defined by the outer perimeter; and
    a cladding surrounding the core;
wherein
    the core is rare earth doped and substantially free of germanium,
    the optical fiber has a refractive index profile such that the core is guiding for optical radiation having the optical wavelength, and
    the optical fiber has an acoustic index profile such that the core is antiguiding for an acoustic wave having the SBS acoustic wavelength.

2. An optical fiber according to claim 1, wherein the region of the fiber outside of the core and within 5 μm of the outer perimeter thereof has an average acoustic index at least about 0.005 greater than the average acoustic index of the region of the core lying no more than 20% of the average core radius from the geometrical center of the core.

3. An optical fiber according to claim 1, wherein the optical fiber further comprises a second cladding surrounding the cladding and having an inner perimeter, wherein the cladding and the region of the second cladding within 10 μm of its inner perimeter differ in refractive index profile, acoustic index profile, or both.

4. An optical fiber according to claim 3, wherein the region of the optical fiber outside of the core and within 5 μm of the outer perimeter thereof has an average acoustic index greater than the average acoustic index of the region of the second cladding lying within 10 μm of its inner perimeter.

5. An optical fiber according to claim 1, wherein the core has an average germanium concentration of no more than about 0.01 wt % measured as $GeO_2$.

6. An optical fiber according to claim 1, comprising a normalized overlap integral between the electric field of the fundamental guided optical mode for the optical wavelength and the lowest order longitudinal acoustic field for the SBS acoustic wavelength, and wherein the value of the overlap integral is no greater than about 0.5.

7. An optical fiber according to claim 6, wherein the value of the overlap integral is no less than about 0.05.

8. An optical fiber according to claim 1,
    wherein the core consists essentially of a first region that includes the geometrical center, and a second region immediately surrounding the first region and extending to the outer perimeter of the core, wherein
    the core has a $\Delta n_{max}$ that is the difference between the maximum refractive index of the core and the average refractive index of the region of the cladding within 5 μm of the outer perimeter of the core;
    the difference between the average refractive indices of the first region of the core and the second region of the core is no more than about $0.5\Delta n_{max}$;
    the core has a $\Delta AI_{max}$ that is the difference between the average acoustic index of the region of the fiber outside of the core and within 5 μm of the outer perimeter thereof and the minimum acoustic index of the core; and the difference between the average acoustic indices of the first region of the core and the second region of the core is no less than about $0.5\Delta AI_{max}$.

9. An optical fiber according to claim 1, wherein the refractive index profile is graded from a maximum value at or near the geometrical center of the core to a substantially lower value at the outer perimeter of the core; and the acoustic index profile is graded from a minimum value at or near the geometrical center of the core to a substantially higher value at the outer perimeter of the core.

10. An optical fiber according to claim 9, wherein the core has a $\Delta n_{max}$ that is the difference between the maximum refractive index of the core and the average refractive index of the region of the cladding within 5 μm of the outer perimeter of the core; and the difference between the refractive index of the core at its outer perimeter and the average refractive index of the region of the cladding within 5 μm of the outer perimeter of the core is no more than about $0.3\Delta n_{max}$.

11. An optical fiber according to claim 1, wherein the core is doped with aluminum.

12. An optical fiber according to claim 11, wherein the core is co-doped with fluorine and/or boron.

13. An optical fiber according to claim 1, wherein at least part of the core is doped with both phosphorus and aluminum.

14. An optical fiber according to claim 1, wherein any region of the optical fiber in which a rare earth is doped is substantially free of germanium.

15. An optical fiber according to claim 1, wherein the rare earth is ytterbium, erbium, or a combination of erbium and ytterbium.

16. A high power optical fiber device comprising:
an optical fiber according to claim 1; and
a pump source operatively coupled to the optical fiber.

17. An optical fiber for the propagation of optical radiation having an optical wavelength, the optical fiber comprising
a core having a geometrical center and an outer perimeter; and
a cladding surrounding the core;
wherein
the core is doped with aluminum and a refractive index-reducing dopant; and
the optical fiber has a refractive index profile such that the core is guiding for optical radiation having the optical wavelength.

18. An optical fiber according to claim 17, wherein the optical fiber and optical wavelength have an SBS acoustic wavelength associated therewith, and wherein the optical fiber has an acoustic index profile such that the core is antiguiding for an acoustic wave having the SBS acoustic wavelength.

19. An optical fiber according to claim 17, wherein the core is rare earth doped and substantially free of germanium.

20. The optical fiber according to claim 17, wherein
the core is doped with aluminum and phosphorus; and
the optical fiber and optical wavelength have an SBS acoustic wavelength associated therewith, and wherein the optical fiber has an acoustic index profile such that the core is antiguiding for an acoustic wave having the SBS acoustic wavelength.

* * * * *

UNITED STATES PATENT AND TRADEMARK OFFICE
CERTIFICATE OF CORRECTION

PATENT NO. : 8,655,129 B2  Page 1 of 1
APPLICATION NO. : 13/145653
DATED : February 18, 2014
INVENTOR(S) : Tankala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 199 days.

Signed and Sealed this

Twenty-ninth Day of September, 2015

Michelle K. Lee
*Director of the United States Patent and Trademark Office*